United States Patent [19]

Miller et al.

[11] Patent Number: 5,014,333
[45] Date of Patent: May 7, 1991

[54] IMAGE PROCESSOR WITH SMOOTH TRANSITIONING BETWEEN DITHER AND DIFFUSION PROCESSES

[75] Inventors: Rodney L. Miller, Rochester; Roger R. A. Morton, Penfield, both of N.Y.

[73] Assignee: Eastman Kodak Company, Rochester, N.Y.

[21] Appl. No.: 222,610

[22] Filed: Jul. 21, 1988

[51] Int. Cl.⁵ .............................................. G06K 9/40
[52] U.S. Cl. ...................... 382/54; 358/443; 358/466
[58] Field of Search .................. 382/50, 52, 54; 358/443, 453, 463, 464, 261.2, 466

[56] References Cited

U.S. PATENT DOCUMENTS

| | | | |
|---|---|---|---|
| 4,339,774 | 7/1982 | Temple | 382/50 |
| 4,876,610 | 10/1989 | Nuter et al. | 382/54 |
| 4,878,125 | 10/1989 | Katayama et al. | 358/443 |

OTHER PUBLICATIONS

Stoffel et al., "A survey of Electronic Techniques for Pictorial Image Reproduction", *IEEE Trans of Comm.*, vol. COM-29, #12, Dec. 1981, pp. 1898-1925.
Fox et al., "Multiple Trans Correction Algorithm for Halftone, Continuous Tone and Text Reproduction", IBM Tech. Disc. Bulletin, vol. 23, #10, Mar. 1981, pp. 4433-4435.

*Primary Examiner*—David K. Moore
*Assistant Examiner*—Joseph Mancuso
*Attorney, Agent, or Firm*—Dennis R. Arndt

[57] ABSTRACT

An image processor converts a multiple gray-level image to a bi-tonal image using both error diffusion and ordered dither to enhance image quality. The error diffusion process is attenuated smoothly as the local area intensity approaches a light or dark maximum, while the ordered dither process is attenuated smoothly as the local area high spatial frequency content increases.

9 Claims, 3 Drawing Sheets

IMAGE PROCESSOR WITH SMOOTH TRANSITIONING BETWEEN DITHER AND DIFFUSION PROCESSES

CROSS-REFERENCE TO RELATED APPLICATIONS

This application contains subject matter related to U.S.S.N.134,621, "Image Processor With Error Diffusion Modulated Threshold Matrix" by Rodney Lee Miller et al. filed Dec. 17, 1987.

BACKGROUND OF THE INVENTION

The accurate portrayal of images which contain multiple (more than two) gray-levels, such as photographs, with a bi-tonal imaging device which can generate only two levels (e.g. black and white), such as a dot matrix printer, can be accomplished if the imaging device produces dots which are ignored by the eye at normal viewing distance. This makes it possible to take advantage of the integrating tendencies of the eye and allow it to infer an intermediate gray-level based upon the percentage of black or white pixels over some local area of the image.

The gray-level is established for each incoming image pixel by sampling the brightness of the image pixel and representing it as a binary eight-bit number, for example. Typically, for each sampled pixel, a decision must be made, based on the gray-level, whether or not to print a dot. If the maximum gray-level of a sampled pixel is 255, one may select the gray-level 128 as the threshold for a print/no print decision. In order to reduce the apparent effects of noise, the threshold may be determined by the location of the pixel in the image in accordance with an ordered dither matrix. Various types of ordered dither matrices are well-known in the art, such as the concentrated dot matrix and the diffused dot matrix, both described in, Kawamura, "Image Processing For Halftone Reproduction", Denshi Shashin Gakkai-shi (*Electrophotography*), Vol. ≧, No. 1, 1985, pp. 51–59. Their use in enhancing apparent image quality in the presence oF noise is well-understood and need not be described here. Another useful reference is Ulichney, *Digital HalFtoning*, The MIT Press, Cambridge, MA. 1987.

Quantization error limits the quality of the reproduced image. Specifically, the input pixel gray-level may exceed the print threshold where a decision to print a dot has been made, or may exceed zero while falling below the print threshold where a decision to not print has been made. The error in the former case is the amount by which the incoming pixel gray-level exceeds the black or white print value. In the latter case, the error is the difference by which the incoming pixel gray-level exceeds zero. Such errors represent incoming image information which has been essentially discarded by the simple "print/no print" decision process. This problem always exists whenever a bi-tonal system must reproduce a multiple gray-level image.

This fundamental problem has been ameliorated significantly by a technique known as error diffusion, first described by Floyd and Steinberg "An Adaptive Algorithm for Spatial Grayscale". *The Proceedings of SID*. Vol. 17/2 (1976). In this technique, the error generated by the print/no print decision of a given pixel, rather than being simply discarded, is used to modulate the value of the next incoming pixel gray-level. The primary advantage of this technique is its ability to infer a large number of gray-levels in the reproduced bi-tonal image. It performs especially well in the presence of edges or very fine details in the image.

An image processor which employs both an ordered dither matrix and error diffusion in combination is described in U.S. Pat. Application Serial No. 134,621 entitled "Image Processor With Error Diffusion Modulated Threshold Matrix" filed Dec. 17, 1987 by Rodney Lee Miller et al. (and referenced hereinabove). The invention described in the referenced patent application is characterized by an image quality greater than that obtained from a straightforward simplistic combination of the two processes of ordered dither and error diffusion. As described in the referenced patent application, this improvement is obtained by modifying the ordered dither matrix in such a manner as to precisely counteract the artifact-generating tendency of the error diffusion process.

PROBLEM TO BE SOLVED BY THE INVENTION

A bi-tonal imaging device (e.g. dot matrix printer) reproduces very light and very dark regions of the image by placing either black or white pixels relatively far apart, resulting in a low frequency structure in which noise is readily detected by the eye. In these regions, pure ordered dither has an advantage and in fact would be preferable to a combination of ordered dither and error diffusion.

The combination of error diffusion and ordered dither reproduces edges in a manner inferior to that of pure error diffusion. Accordingly, in regions containing edges, pure error diffusion is preferable to a combination of ordered dither and error diffusion. Accordingly, the problem is how to process the image using ordered dither exclusively in local areas which are very dark or very light, and to process the image with error diffusion exclusively in local areas containing edges (i.e., areas characterized by high spatial frequency content) and to otherwise process the image using a combination of ordered dither and error diffusion.

More specifically, the problem is how to make a transition between any two of the three processes (i.e., (a) pure ordered dither, (b) pure error diffusion and (c) the combination of error diffusion and ordered dither) without introducing artifacts into the resulting image arising from the transition itself. The difficulty is that an abrupt transition from one process to the other (for example from pure ordered dither to pure error diffusion, depending upon the contents of the incoming multiple gray-level image), may create an artifact in the resulting bi-tonal image which did not exist in the original gray-level image.

SUMMARY OF THE INVENTION

Error diffusion and ordered dither are combined in an image processor which attenuates each of them individually in response to different parameters. The error diffusion process is smoothly attenuated as the processor senses that the local area is approaching a very light or a very dark limit. The ordered dither process is smoothly attenuated as the image processor senses an increase in the high spatial frequency content of the local area. Thus, the image processor treats each local area in an image frame individually, depending upon the image contents. The attenuation of the ordered dither process and of the error diffusion process is done in a nearly smooth or non-abrupt manner so that there are no abrupt transitions.

In order to provide for a smooth non-abrupt transition when attenuating the error diffusion process, the image processor operates on each pixel by computing the average intensity of a local neighborhood of pixels surrounding the pixel of interest, and feeds this average intensity to a converter. The converter produces a multiplier value which can assume one of a continuum of values, depending upon the average intensity measured in the local area. The converter generates a maximum multiplier value whenever the average intensity is about half-way between a very high image intensity threshold and a very low image intensity threshold. As the local area average intensity approaches either the high or low threshold, the multiplier value gradually decreases towards zero, and beyond either threshold is equal to zero. The multiplier value modulates the error diffusion feedback to achieve the desired result. In order to achieve a smooth non-abrupt transition while attenuating the ordered dither process, the image processor measures the amount oF high spatial frequency content of the local neighborhood around the pixel of interest. The measuremen is then used to determine which of a plurality of dither matrices is to be selected for processing the pixel in question. In one embodiment, if the plurality of dither matrices are all of the type known as the "concentrated dot matrix", the centermost pixels have the lowest print/no print thresholds, while the pixels away from the center have higher print/no print thresholds, much like a "bell curve". In this embodiment, the plurality of dither matrices range from a very sharp contour in the first dither matrix between the center values and the outer values, to a flat contour (uniform threshold values) in the last matrix.

If the local area high spatial frequency content is small, then the image processor selects one of the more sharply contoured dither matrices. If, on the other hand, the local area high spatial frequency content is relatively large, then the image processor selects one of the less sharply contoured (flat) dither matrices. Ideally, in the presence of sharply defined edges, the image processor "de-selects" the ordered dither process by selecting the dither matrix whose contour is perfectly flat, i.e., whose elements (thresholds) are uniform.

The smoothness with which the error diffusion process is attenuated by the image Processor of the present invention is a function of the number of discrete multiplier values of which the converter is capable of producing over a given range of local area average intensity values. The smoothness with which the image processor attenuates the ordered dither process is a function of the number of dither matrices which the image processor can select between the sharpest dither matrix and the least sharp (uniform) dither matrix. Providing such smooth transitions between ordered dither and error diffusion in the image processor of the present invention virtually eliminates artifacts which might otherwise arise from sharply attenuating either error diffusion or ordered dither.

DESCRIPTION OF THE DRAWINGS

The invention may be understood by reference to the accompanying drawings, of which.

DETAILED DESCRIPTION

Bi-tonal Representation of a Gray Scale Image

Figure 1:
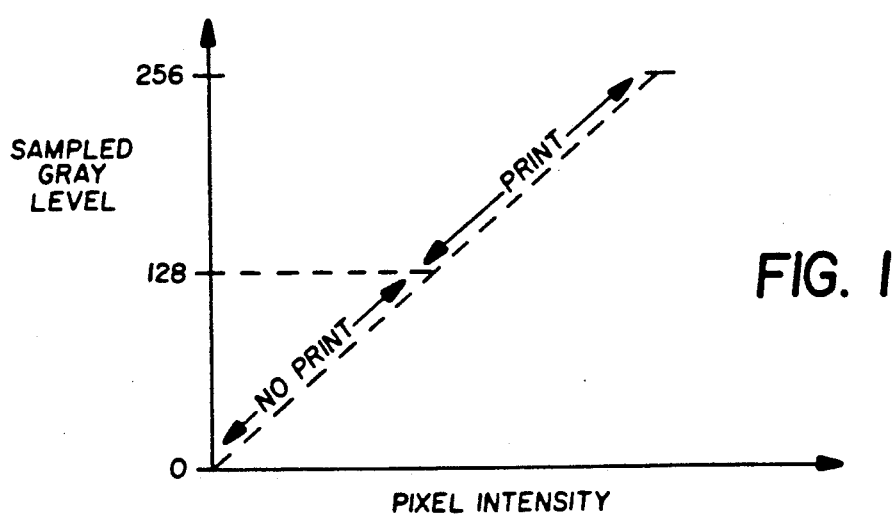
FIG. 1 is a graph illustrating conversion of a gray-level image to a bi-tonal image.

Referring to FIG. 1, a sampled pixel in a gray scale image is represented by an eight-bit byte. The byte assumes an integer value between 0 and 255 as representative of the pixel's gray-level. The graph of FIG. 1 shows that as pixel intensity goes up, the value represented by the byte goes up proportionally. If the corresponding gray scale image must be represented in a bi-tonal medium (such as a printer or a copier), a decision must be made for each pixel in the image whether or not to print a dot corresponding to that pixel. (In a more complex system, a decision must be made as how many dots must be printed in a cluster depending upon the gray-level of the sampled pixel.) In the example of FIG. 1, a gray-level of 128 is chosen as the print/no print threshold decision point. If the pixel has a gray-level 128 or greater, a dot is printed in the corresponding location in the bi-tonal medium. If not, no dot is printed. The printed dot thus represents a gray-level of 128. Therefore, there is a "pixel error" depicted in FIG. 1 corresponding to the difference by which the sampled gray-level exceeds the gray-level of the printed dot or the "print value" (or the amount by which it exceeds zero when no dot is printed). This difference is ignored in the simple "print/no print" decision. Loss of such information represents a decrease in the bi-tonal image quality. (The print value of the dot is a characteristic of the printer, toner or medium and is a known quantity. It may be the same as or different from the threshold value.)

Error Diffusion

Figure 2:
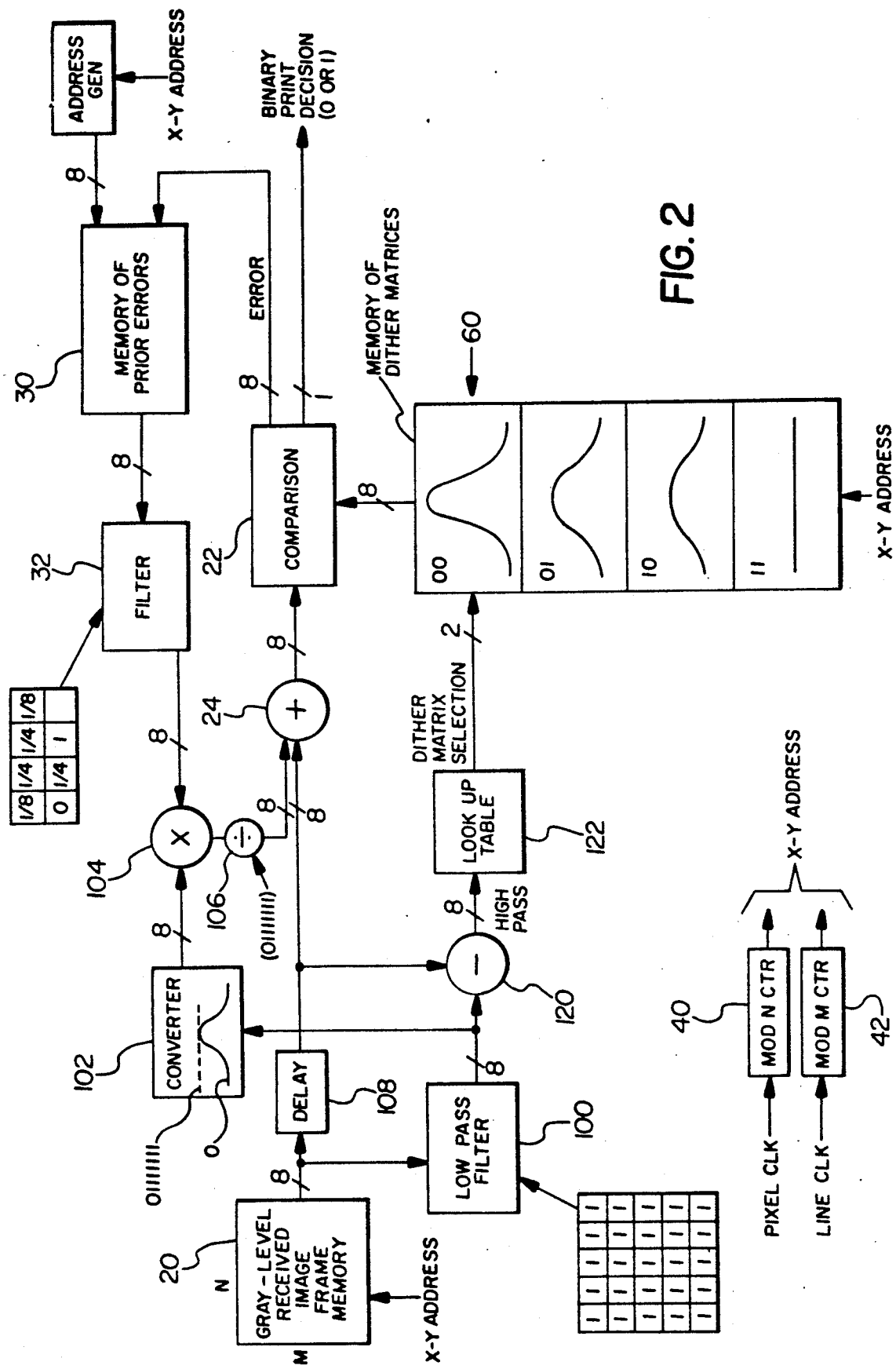
FIG. 2 is a block diagram illustrating a preferred embodiment of the invention.

Referring to FIG. 2, a sampled image 20 comprising a plurality of eight-bit sampled pixel words arranged in m rows and n columns is to be printed in a bi-tonal medium. Each sampled pixel, or eight-bit word, is compared by a comparator 22 with a threshold value, which is another eight-bit word. In the example of FIG. 1, the threshold value would be 128. The comparator 22 generates two outputs, namely a print or no print decision (which may be represented as a binary 0 or a binary 1, respectively) and a pixel error. The pixel error is either (a) the difference (positive or negative) between the print value of a dot and the eight-bit word representing the sampled pixel if a dot is printed, or (b) the value of the sampled pixel (eight-bit word) if no dot is printed. In order to diffuse the error, it is added in an adder 24 to the next incoming sampled pixel. The resulting sum is compared with the threshold value. Thus, the pixel error, rather than being discarded or lost, is retained and used in subsequent threshold comparisons. The successive print/no print decisions issued by the threshold comparator 22 generate a bi-tonal printed image 26.

A sophisticated version of the error diffusion algorithm requires the use of a memory 30 and a filter 32. The memory 30 stores many (if not all) of the prior pixel errors computed by the threshold comparator 22 in an order reflecting the locations of the corresponding pixels in the image. The filter 32 selects more than just the most recent error for feeding back into the adder 24. Specifically, the filter 32 illustrated in FIG. 2 fetches the four errors from the preceeding video line closest to the next sampled pixel as well as the error immediately preceeding the next sampled pixel, and multiplies the corresponding errors stored in the memory 30 by various coefficients. Specifically, the errors corresponding to the three pixels closest to the next sampled pixel are multiplied by $\frac{1}{4}$, while the errors associated with the remaining two pixels are multiplied by $\frac{1}{8}$ (as illustrated). The resulting products are added together to form an error diffusion feedback sum at the output of the filter 32. This sum is added to the gray-level of the next sampled pixel in the adder 24 before the comparator 22 performs the next threshold comparison.

The memory 30 may be thought of as a random access memory which receives an X/Y address. Furthermore, the sampled image 20 may be thought of as a frame store memory adapted to receive the stream X/Y addresses.

The X/Y address is generated by addressing a modulus n counter 40 with a pixel clock and a modulus m counter 42 with a line clock. The line clock corresponds to the rate at which each new row of video data in the sampled image 20 is accessed while the pixel clock defines the rate at which individual pixels in each line are addressed. The symbol n denotes the number of pixels in each line and m denotes the number of lines in each frame. An address generator 44 computes, from the X/Y address, the memory addresses of the previous "errors" stored in the memory 30 which must be used by the filter 32 and the adder 24 to perform the error diffusion algorithm for the next sampled pixel. For each new incoming sampled pixel, the X/Y address changes so that a new set of errors are fetched from the memory 30 and furnished to the filter 32.

Ordered Dither

Figure 4:
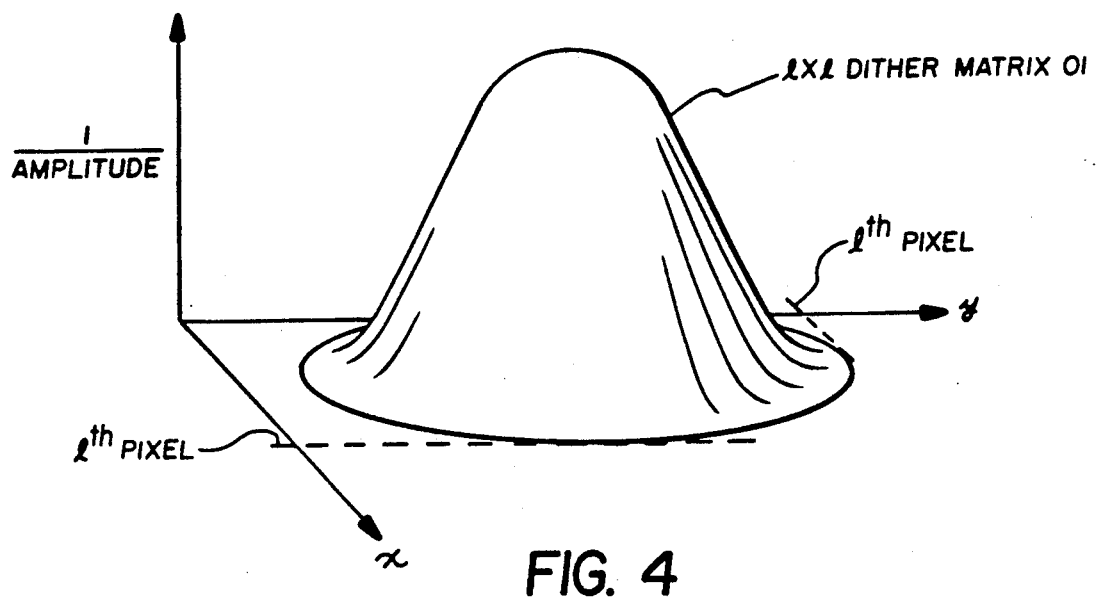
FIG. 4 is a perspective three dimensional graph suggestive of the topography of a dither matrix used in the embodiment of FIG. 1.
Figure 3:
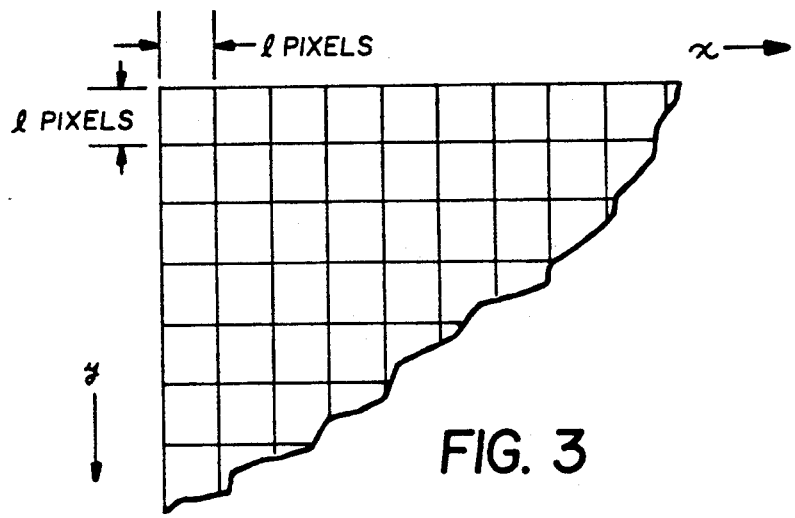
FIG. 3 is a diagram illustrating the superpositioning of a plurality of identical dither matrices on a large image frame.

In order to reduce discernible noise in areas of the image which are uniform (and therefore in which noise is more easily discerned) the process of ordered dither artificially modulates the image in accordance with a predetermined pattern. This takes advantage of the integrating tendencies of the human eye to reduce apparent noise. Ordered dither employs a set of print/no print threshold values which are different for different pixels in the image. The pattern of such non-uniform print/no print threshold values may be repetitive, the basic pattern being defined by a matrix of L columns and L rows of pixels, this matrix being the ordered dither matrix. The ordered dither matrix is repeated across the entire image frame of M rows and N columns in the manner of FIG. 3. Each of the ordered dither matrices in FIG. 3 has the topography suggested in the inverted graph of FIG. 4, in which the center print threshold values are lower while the outer print/no print thresholds are higher. The correct threshold (dither matrix element) for a given pixel in the image is accessed in the memory 60 by computing a memory address from the X-Y address of the given pixel (furnished by the modulus M and modulus N counters 40, 42). This computation simply reduces the X-Y pixel address modulus L. This reduction modulus L is what causes the ordered-dither pattern to be repeated every L rows and L columns of the image. Depending upon the X-Y address of the current image pixel being processed, a corresponding print/no print threshold in the ordered dither matrix is transmitted to the comparator 22, which then employs this particular print/no print threshold in the manner described previously to generate an error diffusion feedback signal and to generate a binary print/no print decision for that pixel.

Problem To Be Solved By The Invention

Ordered dither works best in areas of the image characterized by a low spatial frequency content, so that it would be ideal to attenuate (or eliminate) ordered dithering in areas of the image characterized by high spatial frequencies, Particularly in the presence of sharp edges. Error diffusion works particularly well particularly in local areas of the image characterized by the high spatial frequency content, but does not work well in areas oF the image having very high or very low gray-levels (very bright or very dark areas). Therefore, it would be ideal to attenuate (or eliminate) the error diffusion process in local areas of the image characterized by a very light or very dark average gray-level. Of course, a simplistic approach would be to construct an image processor in which the error diffusion process is switched off for local areas of the image characterized by very low or very high average gray-levels and where the ordered dither process is switched off for local areas characterized by a very high spatial frequency content. Unfortunately, if the image processor makes abrupt transitions between local areas characterized by very high spatial frequency content and adjacent local areas characterized by very high or very low average gray-levels, it could introduce artifacts into the reproduced bi-tonal image, a significant disadvantage. The problem is how to avoid such abrupt transitions between ordered dither and error diffusion.

Non-Abrupt Intelligent Attenuation of Ordered Dither and Error Diffusion (a) Error Diffusion Attenuation In accordance with the invention, the error diffusion process is attenuated in a non-abrupt manner in accordance with the average gray-level of the local area surrounding each pixel of interest in the received image. Referring to FIG. 2, a low pass filter 100 computes the average gray-level amplitude in a neighborhood of five rows and five columns of pixels symmetrically surrounding the current sampled pixel of interest in the received image 20. The low pass filter 100 may be thought of as a five-row-by-five-column kernel or matrix, whose elements are all unity. This kernel is positioned so that its center element coincides with the current pixel of interest in the received image stored in the memory 20. The eight-bit amplitudes of all the pixels in the five-by-five neighborhood surrounding the current pixel of interest are averaged together. This average is transmitted by the low pass filter 100 as an eight-bit word to a converter 102. The converter 102 produces an eight-bit attenuation factor which is applied to one input of a multiplier 104. The error diffusion feedback sum from the output of the filter 32 is applied to the other input of the multiplier 104. The multiplier 104 multiplies the error diffusion feedback sum by the attenuation factor, and the resulting product is normalized in a divider 106 before being added to the next incoming pixel value by the adder 24 in the manner described previously herein.

Figure 5:
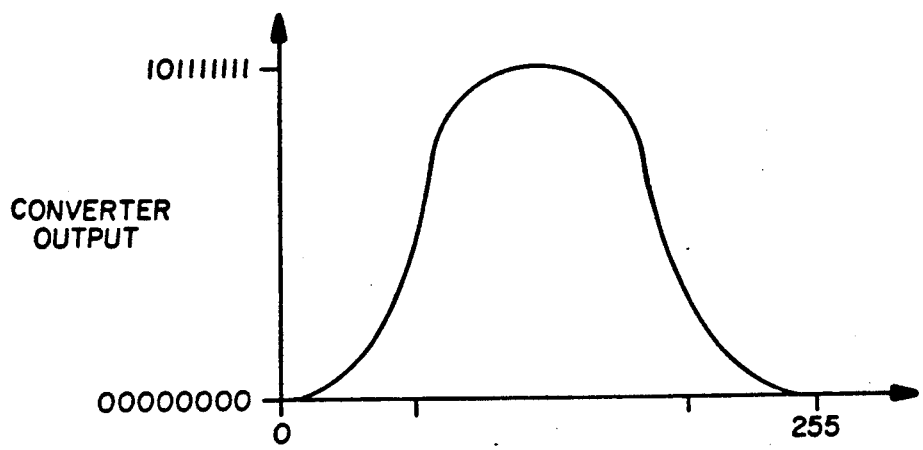
FIG. 5 is a diagram illustrating the intelligent attenuation of the error diffusion feedback in the embodiment of FIG. 1.

Referring to FIG. 5, the converter 102 produces the attenuation factor in response to the output of the low pass filter 100 so that the attenuation factor is unity (no attenuation) whenever the low pass filter output 100 is mid-way between zero and 255. As the local area average gray-level approaches its maximum value (255) or its minimum value (0) the attenuation factor produced by the converter 102 falls smoothly to zero (complete attenuation). In the example illustrated in FIGS. 2 and 5, the converter produces an eight-bit attenuation factor lying in the range of 00000000 and 01111111. The output of the multiplier 104 is scaled in a divider 106 by dividing it by 01111111. The result is that the error diffusion feedback sum from the filter 32 is not attenuated as long as the local area average gray-level (provided by the low pass filter 100) lies in an intermediate range. However, the error diffusion feedback is attenuated smoothly to zero as the incoming sampled pixels from the memory 20 are characterized more and more by either very high or very low average gray-levels in their neighborhoods.

As each new image pixel from the memory 20 is processed, a new local area average gray-level must be computed by the low pass filter 100, corresponding to the five rows and five columns of pixels symmetrically surrounding the current pixel of interest. In effect, the five-row-by-five-column kernel characterizing the low pass filter 100 is moved across the M columns and N rows of the image stored in the memory 20, one pixel at a time. As this happens, the local area average gray-level may vary, depending upon the contents of the image stored in the memory 20.

The converter 102 may be implemented readily as a look-up table which stores a set of eight-bit output words addressed by the eight-bit output of the low pass filter 100, the look-up table being characterized by the graph of FIG. 5. While the graph of FIG. 5 indicates a smooth curve, it is understood that there are really 256 discrete points on the curve of FIG. 5.

The low pass filter 100 must store at least four N-pixel rows of the image received from the memory 20 in order to be able to compute an average based on the five columns and five rows surrounding the current pixel of interest. Accordingly, a delay line 108 (equivalent to four video horizontal scan times) is interposed at the output of the memory 20 so that the output of the low pass filter 100 is in synchronism with the image data transmitted from the memory 20 to the adder 24.

(b) Ordered Dither Attenuation

Figure 6:
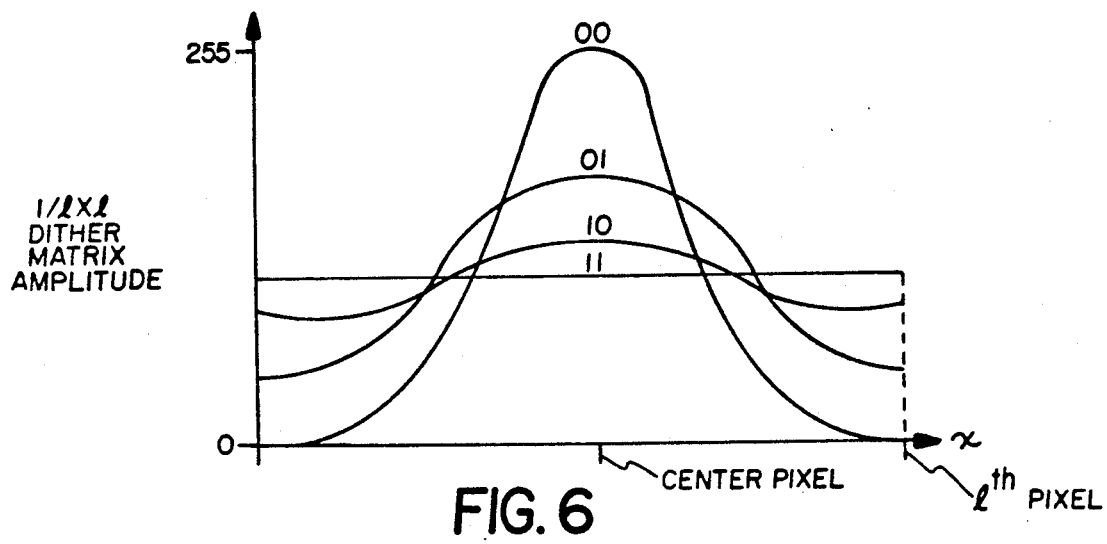
FIG. 6 illustrates different contours among a plurality of dither matrices stored in the system of FIG. 1.

The ordered dither process is attenuated in a non-abrupt manner using a plurality of dither matrices stored in the memory 60. In the example of FIG. 2, four dither matrices are stored in the memory 60, their contours ranging from flat to very sharp, as illustrated in FIG. 6. The sharpest dither matrix is labeled 00 while the flattest dither matrix is labeled 11.

The amplitude of the high spatial frequency content of the local neighborhood of each pixel of the image stored in the memory 20 is determined, and this amplitude is then employed to select one oF the four dither matrices from the memory 60. If the high spatial frequency content of the local neighborhood is small, one of the more sharp dither matrices is selected. On the other hand, if the high spatial frequency content of the local neighborhood is large, then one of the more flatly contoured dither matrices is selected. This provides a more gradual attenuation of the ordered dither process. The most sharply contoured dither matrix corresponds to an unattenuated ordered dither process, while the perfectly flat ordered dither matrix corresponds to a fully attenuated ordered dither process.

Figure 7:
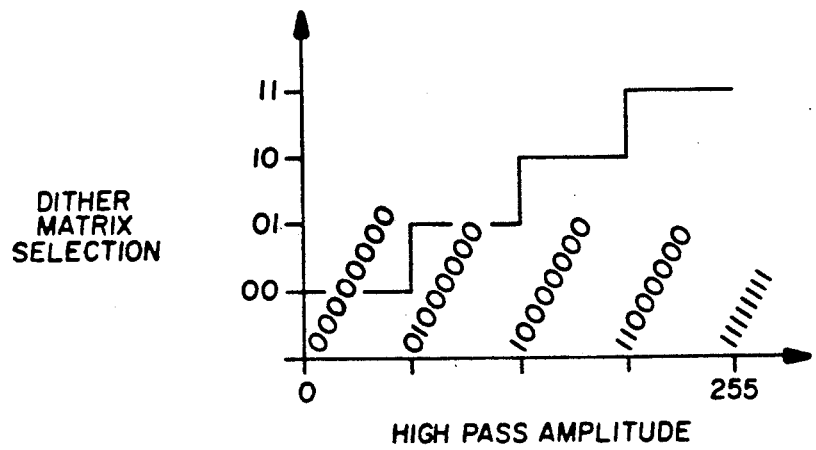
FIG. 7 is a graph illustrating the operation of the look-up table in the embodiment of FIG. 2.

The foregoing process is accomplished by subtracting in a subtractor 120 the output of the low pass filter 100 from the unfiltered output of the memory 20, the output of the subtractor 120 comprising a high pass output which is transmitted as an address to a read only memory look-up table 122. The look-up table 122 selects one of the ordered dither matrices stored in the memory 60 depending upon the amplitude of the high pass filter (i.e., output of the subtractor 120) in accordance with the graph of FIG. 7.

In this example, because there are four ordered dither matrices stored in the memory 60, the eight-bit range of the high pass output from the subtractor 20 is divided into four ranges. These ranges are indicated on the horizontal axis labeled "high pass amplitude" in FIG. 7. As indicated on the vertical axis of the graph of FIG. 7, each of the four high pass amplitude ranges corresponds to a selection of a corresponding one of the four dither matrices stored in the memory 60.

The dither matrix selection produced by the look-up table 122 requires only two bits in this example. One simple way for accomplishing this is to transmit only the two most significant bits from the eight-bit output of the subtractor 120 as the two-bit address word to the look-up table 122. This arrangement provides the four distinct selection ranges illustrated in FIG. 7. Of course, other embodiments may be made in which the number of dither matrices is much greater so that the dither matrix selection requires more than two bits. The four dither matrices range proportionately from flat (matrix 11), to less flat (matrix 10) to more sharp (matrix 01) to sharpest (matrix 00). It is possible that four successive image pixels received from the memory 20 may be processed with different ones of the four ordered dither matrices stored in the memory 60, although this is unlikely. The point is that the high pass output from the subtractor 120 defines the amplitude of the high spatial frequency content of the local neighborhood surrounding the current pixel of interest, and based upon this amplitude, one of the dither matrices stored in the memory 60 is selected For transmission to the comparator 22.

The comparator 22 uses the selected dither matrix from the memory 60 in the manner described previously in the description of the ordered dither process given above in this detailed description.

It is within the scope of the invention to employ a much larger number of dither matrices so that the attenuation of the ordered dither process is even less abrupt. Of course, the greater the number of ordered dither matrices which are used to provide a transition between the sharpest contour dither matrix and the flattest contour dither matrix, the less abrupt the transition between them will be. (It is also within the invention to use less than four ordered dither matrices in a manner similar to that described in connection with FIG. 2.)

In summary, the invention provides non-abrupt attenuation of the error diffusion process as the local area intensity becomes very light or very dark, and of the ordered dither process as the local area high spatial frequency content increases towards a maximum value and provides a generally unattenuated combination of both error diffusion and ordered dither otherwise. As a result, the different advantages of the two processes are selectively exploited across the entire image without introducing artifacts (due to abrupt transitions) into the resulting bi-tonal image.

While the invention has been described in detail with specific reference to preferred embodiments thereof, it is understood that variations and modifications thereof may be made without departing from the spirit and scope of the invention.

What is claimed is:

1. An image processor comprising:

image memory means for storing an image comprising a frame of M columns and N rows of multi-gray level pixels;

adder means for forming successive input amplitudes from successive ones of said pixel so as to form a current input amplitude corresponding to the current one of said pixels;

means for comparing said current input amplitude with a dithered threshold so as to generate:
   a. a binary print/no print decision,
   b. a feedback error;

means for attenuating said feedback error so as to produce an attenuated error, said attenuating means responsive to the average gray level of a local neighborhood of pixels surrounding said current pixel so as to attenuate said feedback error proportionately as said average gray level approaches a light or dark limit;

means for transmitting said attenuated error to said adder means so that said adder means adds said attenuated error to the next one of said successive pixels to form the next one of said successive input amplitudes; and means for transmitting said dithered threshold to said comparator means, comprising:
   a. means for storing a plurality of ordered dither matrices, each of said matrices defining plural patterns of dithered thresholds as individual elements in each of said matrices, each of said patterns characterized by dither threshold amplitudes for each of said M ×N pixels spatially modulated with a contour of a characteristic sharpness,
   b. means for sensing the amplitude of the high spatial frequency content of said local neighborhood,
   c. means for selecting one of said plurality of ordered dither matrices whereby the characteristic sharpness of the one ordered dither matrix so selected is inversely proportional to the amplitude of the high spatial frequency content of said local neighborhood, and
   d. means for selecting for said dithered threshold an element within the one selected ordered dither matrix corresponding to the position of the current one of said successive pixels stored in said image storing means, whereby an ordered dither process is provided which is attenuated in proportion to the amplitude of the high spatial frequency content of the local neighborhood surrounding each successive one of said M ×N pixels.

2. The processor of claim 1, wherein said means for attenuating said feedback error comprise:

low pass filter means for determining said average gray level of said local neighborhood of pixels surrounding said current pixel, said local neighborhood comprising a kernel of pixels on the order of about five rows and five columns of such pixels surrounding said current pixel;

converter means responsive to said high pass filter means for generating an attenuation factor which decreases as said average gray level of said local neighborhood approaches either one of said light or dark limit;

means for multiplying said feedback error by said attenuation factor.

3. The processor of claim 2 wherein said attenuation factor is one of a set of discreet attenuation factors lying in a range between a minimum attenuation factor and a maximum attenuation factor, said processor further comprising means for dividing by said maximum attenuation factor the product produced by said means for multiplying so as to produce said attenuated error.

4. The processor of claim 2 wherein said converter means comprises a read only memory storing a set of discreet attenuation factors each being addressable within said read only memory by a corresponding value received from said low pass filter.

5. The processor of claim 1 wherein said means for sensing the amplitude of said high spatial frequency content of said local neighborhood comprises a high pass filter characterized by a kernel of on the order of about five rows and five columns of said pixels comprising said local neighborhood surrounding said current pixel, said high pass filter adaptable to generate a high pass amplitude word comprising L bits.

6. The processor of claim 5 wherein said means for selecting said element within the one selected ordered dither matrix comprise a read only memory, wherein said read only memory is addressable only by the K most significant bits of said L bit word generated by said high pass filter, and wherein said read only memory stores $2^K$ ordered dither matrices.

7. The processor of claim 6 wherein said read only memory is further addressable by one of N×M location words corresponding to the location of said current pixel in said image memory means, whereby said one location word selects within said read only memory the corresponding element in the selected one of said $2^K$ ordered dither matrices.

8. The processor of claim 1 wherein said feedback error comprises (a) the difference between said input amplitude and a known print value if said print/no print decision comprises a decision to print, or (b) the difference between said input amplitude and a value corresponding to zero if said print/no print decision comprises a decision to not print.

9. An image processor for receiving a multiple gray level image comprising an array of image pixels and producing therefrom a bitonal image, said image processor comprising:

error diffusion means for diffusing among neighboring pixels the difference between each image pixel in said array and a binarization threshold so as to produce a succession of error diffused pixels;

ordered dither means for dithering said binarization threshold in accordance with a spatially variant ordered dither pattern of threshold values dithered in accordance with a given contour having a characteristic amplitude excursion;

first attenuation means for attenuating the difference diffused among said neighboring pixels by said error diffusion means proportionally as the average value of a neighborhood of pixels surrounding a corresponding image pixel approaches a light of dark limit; and second attenuation means for attenuating the amplitude excursion of said ordered dither pattern in proportion to the amplitude of the high spatial frequency content of said neighborhood of pixels.

* * * * *